United States Patent
Onaka et al.

(10) Patent No.: US 9,438,303 B2
(45) Date of Patent: Sep. 6, 2016

(54) FRONT END CIRCUIT WHERE AN ANTENNA IS SHARED FOR TRANSMISSION AND RECEPTION IN A WIRELESS COMMUNICATION APPARATUS

(71) Applicant: Murata Manufacturing Co., Ltd., Kyoto (JP)

(72) Inventors: Kengo Onaka, Kyoto (JP); Hiroya Tanaka, Kyoto (JP); Hidenori Obiya, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 10 days.

(21) Appl. No.: 14/576,416

(22) Filed: Dec. 19, 2014

(65) Prior Publication Data

US 2015/0188601 A1   Jul. 2, 2015

(30) Foreign Application Priority Data

Dec. 27, 2013   (JP) ................. 2013-270769

(51) Int. Cl.
*H04B 1/44* (2006.01)
*H04B 1/48* (2006.01)

(52) U.S. Cl.
CPC ........... *H04B 1/48* (2013.01); *H04B 2001/485* (2013.01)

(58) Field of Classification Search
CPC .... H04B 1/0458; H04B 1/525; H04B 1/006; H04B 1/406; H04B 1/0057; H04B 1/0064; H04B 1/0067; H04B 1/0475; H04B 1/18; H04B 1/38; H04B 1/3838; H04B 1/40; H04B 1/403; H04B 1/50; H04B 2203/5491; H04B 7/155; H04B 7/2606; H04W 52/367; H04W 52/08; H04W 52/10; H04W 52/146; H04W 52/245; H04W 52/283; H04W 52/362; H04W 52/52; H03F 1/0277; H03F 1/565; H03F 2200/387; H03F 2200/391; H03F 2200/411; H03F 2200/414; H03F 2220/421; H03F 2200/429; H03F 2200/451

See application file for complete search history.

(56) References Cited

U.S. PATENT DOCUMENTS

2006/0276158 A1* 12/2006 Okabe ...................... H04B 1/38
                                                                    455/333
2007/0149146 A1*  6/2007 Hwang .................. H01Q 1/242
                                                                    455/80
2014/0220905 A1*  8/2014 Buckley .............. H04W 52/362
                                                                    455/69

(Continued)

FOREIGN PATENT DOCUMENTS

JP    H07-273528 A    10/1995
JP    H11-308142 A    11/1999

(Continued)

OTHER PUBLICATIONS

Office Action issued in Japanese Patent Application No. 2013-270769 dated Sep. 29, 2015.

*Primary Examiner* — Golam Sorowar
(74) *Attorney, Agent, or Firm* — Pearne & Gordon LLP

(57) ABSTRACT

A front end circuit includes a transmission signal filter for allowing a transmission signal to pass, a reception signal filter for allowing a reception signal to pass and a circulator (an antenna duplexer), and a transmission output variable circuit is connected between a transmission signal terminal of the circulator and the transmission signal filter. The transmission output variable circuit includes a first high frequency switch, a second high frequency switch, and a buffer circuit, and attenuation is switched by switching of the first high frequency switch and the second high frequency switch.

19 Claims, 7 Drawing Sheets

(56) References Cited

U.S. PATENT DOCUMENTS

| | | | |
|---|---|---|---|
| 2014/0269864 A1* | 9/2014 | Aparin | H04B 1/40 375/221 |
| 2014/0273886 A1* | 9/2014 | Black | H04B 1/3838 455/77 |
| 2014/0355497 A1* | 12/2014 | Reiha | G01S 19/13 370/281 |

FOREIGN PATENT DOCUMENTS

| | | |
|---|---|---|
| JP | 11-340845 A | 12/1999 |
| JP | 2006-060729 A | 3/2006 |
| JP | 2006-166153 A | 6/2006 |
| JP | 2006-245755 A | 9/2006 |
| JP | 2008-258706 A | 10/2008 |

* cited by examiner

FRONT END CIRCUIT WHERE AN ANTENNA IS SHARED FOR TRANSMISSION AND RECEPTION IN A WIRELESS COMMUNICATION APPARATUS

BACKGROUND OF THE INVENTION

1. Field of the Invention

The present invention relates to a front end circuit where an antenna is shared for transmission and reception in a wireless communication apparatus.

2. Description of the Related Art

A front end circuit where an antenna is shared for transmission and reception by using a duplexer and a switch, and a front end circuit where an antenna is shared for transmission and reception by using a circulator have been conventionally proposed. For example, JP 2008-258706 A (Patent Document 1) discloses a constitution of a radio device compatible with multi-band using one common antenna. In the radio device described in Patent Document 1, a transmission line for transmission/reception signals with predetermined frequency bands is connected to the antenna by a switch connected just below the antenna so that the transmission/reception is carried out.

BRIEF SUMMARY OF THE INVENTION

In a radio device such as a portable terminal, impedance of an antenna changes, for example, due to the approach of a human body. As a result, antenna tuning cannot be occasionally achieved. When the antenna tuning is not achieved, a reflection quantity of a transmission signal in the antenna increases, and this reflection signal returns to a power amplifier. As a result, the occurrence of distortion in the transmission signal in the power amplifier causes the deterioration of the transmission signal, the abnormal oscillation of the power amplifier, and the destruction of the power amplifier. Further, the reflection signal leaks to a reception circuit side, and thus the receiver sensitivity is deteriorated.

It is, therefore, an object of the present invention is to provide a front end circuit which solves such problems that a reflection signal returns to a transmission circuit side, and the reflection signal leaks to a reception circuit side, even when antenna non-tuning occurs due to the approach of an object or a human body to an antenna.

A front end circuit of the present invention is constituted as follows.

(1) The front end circuit includes a transmission signal filter for allowing a transmission signal to pass, a reception signal filter for allowing a reception signal to pass, an antenna duplexer, an antenna port into/from which transmission/reception signals of an antenna are input/output, a reception port from which the reception signal is output, a transmission port into which the transmission signal is input, and a transmission output variable circuit that is connected between a transmission signal terminal of the antenna duplexer and the transmission port and limits strength of the transmission signal according to a control signal.

(2) It is preferable that the transmission output variable circuit is connected between the transmission signal terminal of the antenna duplexer and the transmission signal filter.

(3) When a circulator, for example, is used as the antenna duplexer, the constitution can be formed by a small number of elements, and thus control of a switch is not necessary in an antenna duplexing section.

(4) It is preferable that the transmission signal filter and the reception signal filter are, for example, a tunable filter having a variable reactive element or a selectable filter composed of a switch and a plurality of filters. As a result, application over a wide band is enabled.

(5) Further, a front end circuit of the present invention is constituted as follows.

The front end circuit includes an antenna port into/from which transmission/reception signals of an antenna are input/output, a reception port from which the reception signal is output, a transmission port into which the transmission signal is input, and a transmission output variable circuit having an antenna side switch, a plurality of duplexers, a transmission side switch, and a reception side switch, a common terminal of the antenna side switch being connected to the antenna port, common terminals of the duplexers being connected to individual terminals of the antenna side switch, respectively, a common terminal of the transmission side switch being connected to the transmission port, a common terminal of the reception side switch being connected to the reception port, individual terminals of the transmission side switch being connected to transmission terminals of the duplexers, respectively, individual terminals of the reception side switch being connected to reception terminals of the duplexers, respectively, the transmission output variable circuit being connected between the common terminal of the transmission side switch and the transmission port, the transmission output variable circuit for limiting strength of the transmission signal according to a control signal.

(6) It is preferable that the transmission output variable circuit includes a first high frequency switch, a second high frequency switch, and a buffer circuit, and attenuation is switched between the transmission signal terminal and the transmission signal filter by switching of the first high frequency switch and the second high frequency switch. As a result, insertion loss can be reduced when attenuation is not carried out, and the attenuation can be easily controlled.

(7) It is preferable that the transmission output variable circuit can obtain a through state between the first high frequency switch and the second high frequency switch.

(8) The transmission output variable circuit increases the attenuation when, for example, a proximity sensor detects a proximity state of an object with respect to the antenna.

(9) The transmission output variable circuit controls the attenuation according to, for example, strength of a reflection signal from the antenna.

(10) It is preferable that an antenna tuning circuit connected to the antenna port is provided, and this circuit includes at least one variable reactive element.

(11) The control circuit controls the antenna tuning circuit in a state that the attenuation of the transmission output variable circuit is made to be minimum in a range of a small level of antenna non-tuning, and increases the attenuation of the transmission output variable circuit in a range of a high level of the antenna non-tuning.

The present invention provides the front end circuit that solves problems such as the deterioration in a transmission signal, the abnormality of a power amplifier that are caused by return of the transmission signal to the transmission circuit, and a problem such as the deterioration in receiver sensitivity that is caused by leakage of a reflection wave of the transmission signal into the reception circuit side, even

DETAILED DESCRIPTION OF THE INVENTION

Figure 1:
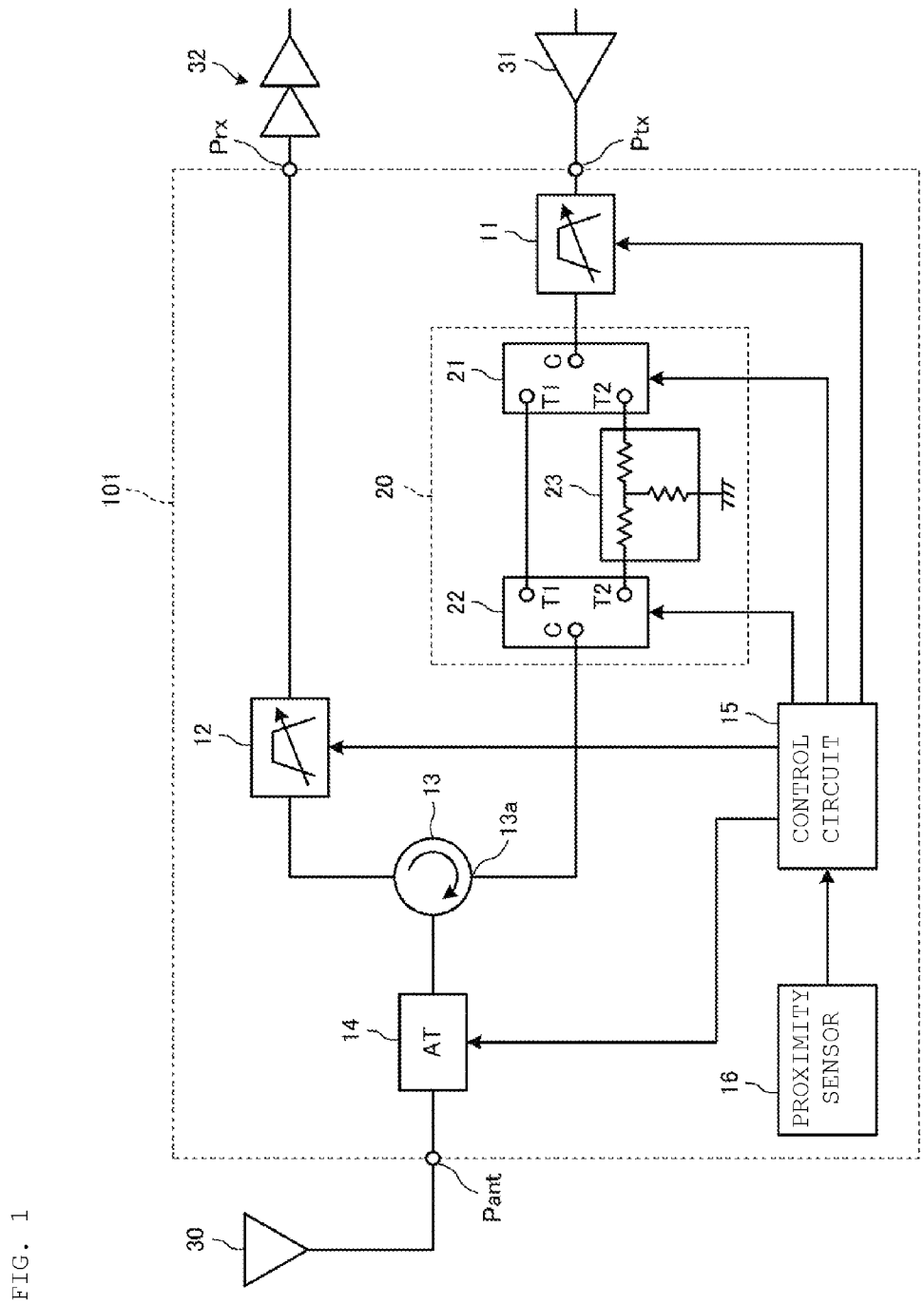
FIG. 1 is a circuit diagram illustrating a high frequency circuit having a front end circuit 101 according to the first embodiment.

A plurality of the embodiments for carrying out the present invention are described below by giving some concrete examples with reference to the drawings. The same members are denoted by the same reference symbols in the drawings. The respective embodiments are illustrative, and it goes without saying that the constitutions described in the respective embodiments can be partially replaced or combined.

First Embodiment

FIG. 1 is a circuit diagram illustrating a high frequency circuit having a front end circuit according to the first embodiment. As shown in FIG. 1, a front end circuit 101 includes a transmission signal filter 11 for allowing a transmission signal to pass, a reception signal filter 12 for allowing a reception signal to pass, and a circulator 13 as an antenna duplexer. The transmission signal filter 11 is a variable band pass filter (Tunable Filter) for the passage of a frequency band of a transmission signal. Similarly, the reception signal filter 12 is a variable band-pass filter (Tunable Filter) for the passage of a frequency band of a reception signal. For example, a variable capacitance element such as a digital tuning capacitor (DTC) is provided, and a control signal input from the outside changes the pass band. A control circuit 15 sends a control signal to the transmission signal filter 11 and the reception signal filter 12 according to a communication frequency band.

Further, the front end circuit 101 includes an antenna port Pant into/from which transmission/reception signals of an antenna are input/output, a reception port Prx from which the reception signal is output, and a transmission port Ptx into which the transmission signal is input. An antenna 30 is connected to the antenna port Pant, a power amplifier 31 is connected to the transmission port Ptx, and a LAN 32 is connected to the reception port Prx.

A transmission output variable circuit 20 is connected between a transmission signal terminal 13a of the circulator 13 and the transmission signal filter 11.

The transmission output variable circuit 20 includes a first high frequency switch (hereinafter, simply "first switch") 21, a second high frequency switch (hereinafter, simply "second switch") 22, and a buffer circuits 23. Switching between the first switch 21 and the second switch 22 switches the attenuation with the impedance matching between the transmission signal terminal 13a of the circulator 13 and the transmission signal filter 11 being maintained. The transmission output variable circuit 20 is in a first state that a common terminal C and a first individual terminal T1 of the first switch 21 are electrically connected with each other and a common terminal C and a first individual terminal T1 of the second switch 22 are electrically connected with each other, and in a second state that the common terminal C and a second individual terminal T2 of the first switch 21 are electrically connected with each other and the common terminal C and a second individual terminal T2 of the second switch 22 are electrically connected with each other. In the first state, since the first switch and the second switch are directly connected to each other, the attenuation is practically and approximately 0. In the second state, the buffer circuit 23 is inserted between the first switch and the second switch, and the buffer circuit 23 limits a transmission power.

An antenna tuning circuit 14 is connected to the antenna port Pant of the front end circuit 101. The antenna tuning circuit 14 has a single reactive element or a plurality of reactive elements, and at least one of the reactive elements is composed of a variable reactive element of which the value is changed by a control signal. In another way, the at least one reactive element is composed of a plurality of reactive elements of which the values are different and a switching element for selecting a predetermined reactive element from them.

A proximity sensor 16 is a sensor for detecting whether an object such as a head of a human body or a metal desk comes close to the antenna 30, and detects, for example, the presence of the reflection of infrared light or a change in a capacity value.

The control circuit 15 controls the transmission output variable circuit 20 based on a detected result of the proximity sensor 16. As described later, the attenuation of the transmission output variable circuit 20 is increased under a condition that a reflected signal in the antenna 30 becomes large.

The antenna tuning circuit 14 is a variable tuning circuit for suitable tuning according to the impedance of the antenna 30. The impedance of the antenna 30 changes according to a frequency, but the control circuit 15 controls the antenna tuning circuit 14 according to the impedance of the antenna (based on the information for indirectly detecting the impedance of the antenna) so that the antenna tuning is tried.

Figure 2:
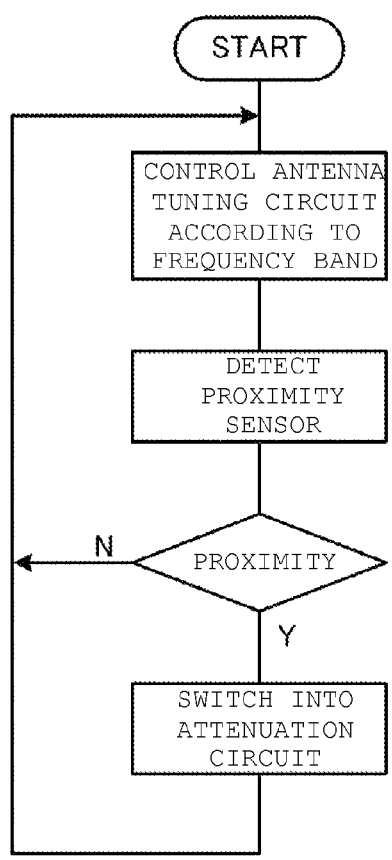
FIG. 2 is a flowchart illustrating the control contents of a control circuit 15 shown in FIG. 1.

FIG. 2 is a flowchart illustrating the control contents of the control circuit 15 shown in FIG. 1. The control circuit 15 first controls the antenna tuning circuit 14 according to a frequency band with which the communication should be carried out. That is to say, the control circuit 15 then controls the antenna tuning circuit 14 in order to achieve the tuning with the impedance of the antenna changing according to the frequency to be used. The control circuit 15 reads a detected result in the proximity sensor 16, and when the object that causes a fluctuation in the impedance of the antenna 30 comes closer than a certain distance, it controls the first switch 21 and the second switch 22 of the transmission output variable circuit 20 so that they select a side of a terminal T2, and increase the attenuation of the transmission output variable circuit 20.

The attenuation of the transmission output variable circuit 20 can eliminate the deterioration in a transmission signal caused by the return of a reflected wave of the transmission signal to a side of a transmission circuit, the attenuation that can eliminate the abnormality of the power amplifier, and the deterioration in the receiver sensitivity caused by a leakage of the reflected wave of the transmission signal to a side of a reception circuit. For example, a transmission power is attenuated by −6 dB.

In this embodiment, since the antenna tuning circuit 14 is provided, the transmission output variable circuit 20 can be in a through state under a condition that the antenna tuning circuit 14 can secure the antenna tuning. For this reason, the attenuation in the transmission output variable circuit 20 is not unnecessarily increased.

Figure 3:
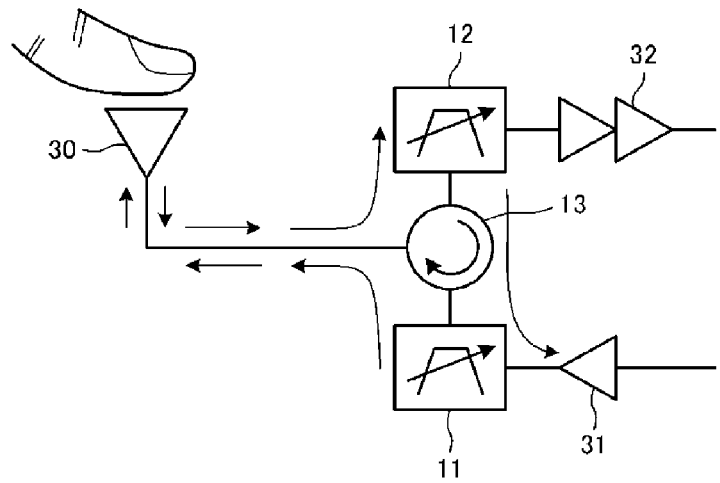
FIG. 3 is a circuit diagram illustrating a front end circuit as a comparative example of the present invention.

FIG. 3 is a circuit diagram illustrating the front end circuit as a comparative example of the present invention. For example, when a hand or a finger comes close to the antenna 30, the impedance of the antenna deviates from a prescribed value so that the antenna tuning is missed. When the antenna tuning is missed, a reflection signal in the antenna 30 is reflected from the reception filter 12 via the circulator 13, passes through the transmission signal filter 11 via the circulator 13, and is incident on the power amplifier 31. On the contrary, according to the front end circuit 101 shown in FIG. 1, when detecting a proximity state of an object with respect to the antenna 30 according to an output from the proximity sensor 16, the control circuit 15 increases the attenuation of the transmission output variable circuit 20, and thus the transmission power is limited. For this reason, when the object comes close to the antenna 30, the impedance of the antenna greatly deviates from the prescribed value, and even when the transmission signal is reflected from the antenna 30, the reflection power is repressed. As a result, the deterioration in a characteristic of the transmission signal (for example, signal quality such as error vector magnitude (EVM)) caused by the incident of the reflection signal on the power amplifier 31, and an increase and abnormal heat of a consumption current of a power amplifier can be prevented. Further, although the circulator is used as the antenna duplexer, the reflection signal of the transmission signal hardly leaks into the reception circuit, and the deterioration in receiver sensitivity caused by the leakage of the transmission signal to the side of the reception circuit can be prevented.

Further, according to this embodiment, since the transmission output variable circuit 20 is inserted between the circulator 13 and the transmission signal filter 11, a reflection wave that returns to the transmission signal filter can be further attenuated. When the antenna tuning is missed, an added signal of the transmission wave and its reflection wave (the signal of which the phase is different from the transmission wave) is applied to the transmission signal filter 11, but when the strength of the reflection wave is decreased, the distortion caused by the addition is repressed. Further, when the transmission signal filter 11 includes a variable capacitance element and a switch, the occurrence of the harmonic distortion caused by the variable capacitance element and the switch is repressed.

In the example shown in FIG. 1, the transmission output variable circuit 20 is inserted between the circulator 13 and the transmission signal filter 11, but the transmission output variable circuit 20 may be inserted between the transmission signal filter 11 and the transmission port Ptx. Also in this case, the deterioration in the characteristic of the transmission signal (for example, the signal quality such as the error vector magnitude (EVM)) caused by the incidence of the reflection signal on the power amplifier 31, and the increase and the abnormal heat of the consumption current of the power amplifier can be prevented. Further, although the circulator is used as the antenna duplexer, the reflection signal of the transmission signal hardly leaks into the reception circuit, and deterioration in the receiver sensitivity caused by the leakage of the transmission signal to the side of the reception circuit can be prevented.

The plurality of the proximity sensors 16 is provided, and they may detect the environment of that the antenna 30. For example, the proximity sensors 16 can detect various states such as a state that a portable terminal having the front end circuit of the present invention comes close to a head portion and is in a communication mode, a state that the portable terminal is being held and operated, or a state that the portable terminal is on a desk and in a standby mode. According to these states, the attenuation of the transmission output variable circuit 20 may be determined.

Second Embodiment

Figure 4:
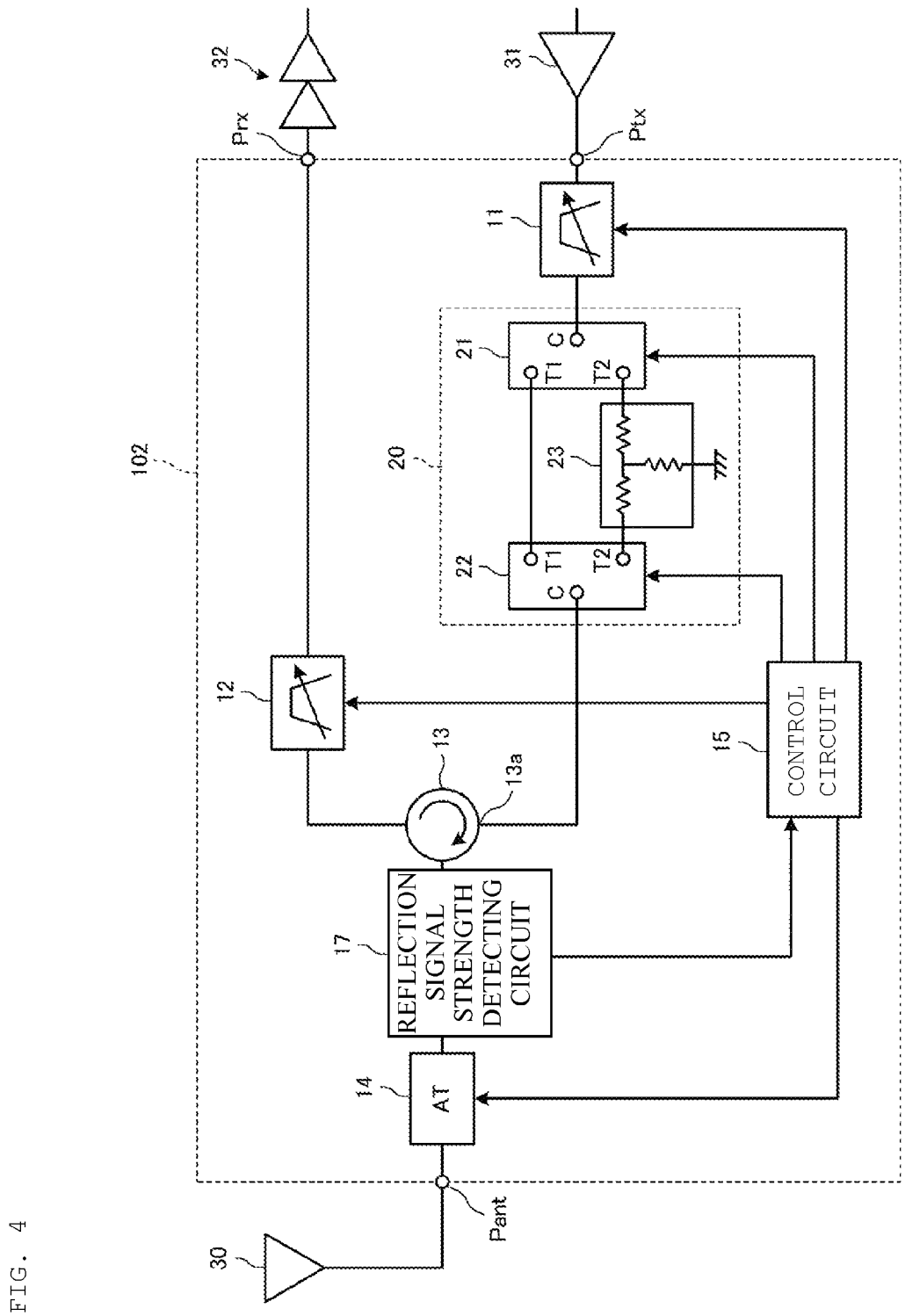
FIG. 4 is a circuit diagram illustrating a high frequency circuit having a front end circuit 102 according to the second embodiment.

FIG. 4 is a circuit diagram illustrating a high frequency circuit having a front end circuit 102 according to the second embodiment. As shown in FIG. 2, a reflection signal strength detecting circuit 17 for detecting the strength of a reflection signal from an antenna 30 is provided. The reflection signal strength detecting circuit 17 is composed of, for example, a bidirectional coupler and a phase amplitude detecting circuit. The bidirectional coupler outputs a transmission signal and a reflection signal separately. The phase amplitude detecting circuit detects an amplitude difference and a phase difference between the transmission signal and the reflection signal. A control circuit 15 adjusts an antenna tuning circuit 14 so that appropriate antenna tuning is achieved based on the amplitude difference and the phase difference between the transmission signal and the reflection signal. Further, the control circuit 15 determines the reflection signal strength based on the amplitude difference between the transmission signal and the reflection signal, and controls the attenuation of a transmission output variable circuit 20 according to the reflection signal strength. The other parts of the constitution are the same as those described in the first embodiment.

As shown in the constitution of this embodiment, the reflection signal strength detecting circuit 17 is connected between the antenna tuning circuit 14 and a circulator 13 (a side closer to the antenna than the circulator 13), so as to be capable of detecting the strength of the reflection signal reflected from the antenna 30 accurately.

Figure 5:
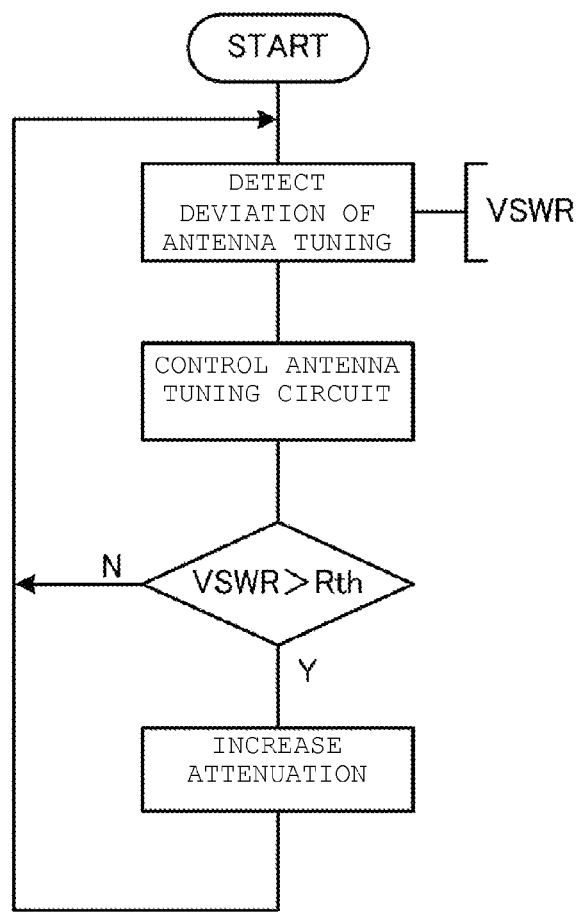
FIG. 5 is a flowchart illustrating the control contents of the control circuit 15 shown in FIG. 4.

FIG. 5 is a flowchart illustrating the control contents of the control circuit 15 shown in FIG. 4. The control circuit 15 detects a deviation of the antenna tuning according to, for example, VSWR obtained by the detection signal from the reflection signal strength detecting circuit 17. The control circuit 15 controls the antenna tuning circuit 14 according to the reflection signal strength (according to a deviation amount of the antenna tuning). That is to say, the impedance tuning is adjusted so that the deviation of the antenna tuning is decreased. For example, a relationship between the VSWR and a control voltage is determined in a table in advance, and the control voltage is output to the antenna tuning circuit 14 with reference to the table. Further, when the VSWR exceeds a predetermined threshold Rth (the adjustment cannot be performed only by the antenna tuning circuit 14), control is made so that a first switch 21 and a second switch 22 of the transmission output variable circuit 20 select a terminal T2, and the attenuation of the transmission output variable circuit 20 is increased.

Third Embodiment

Figure 6:
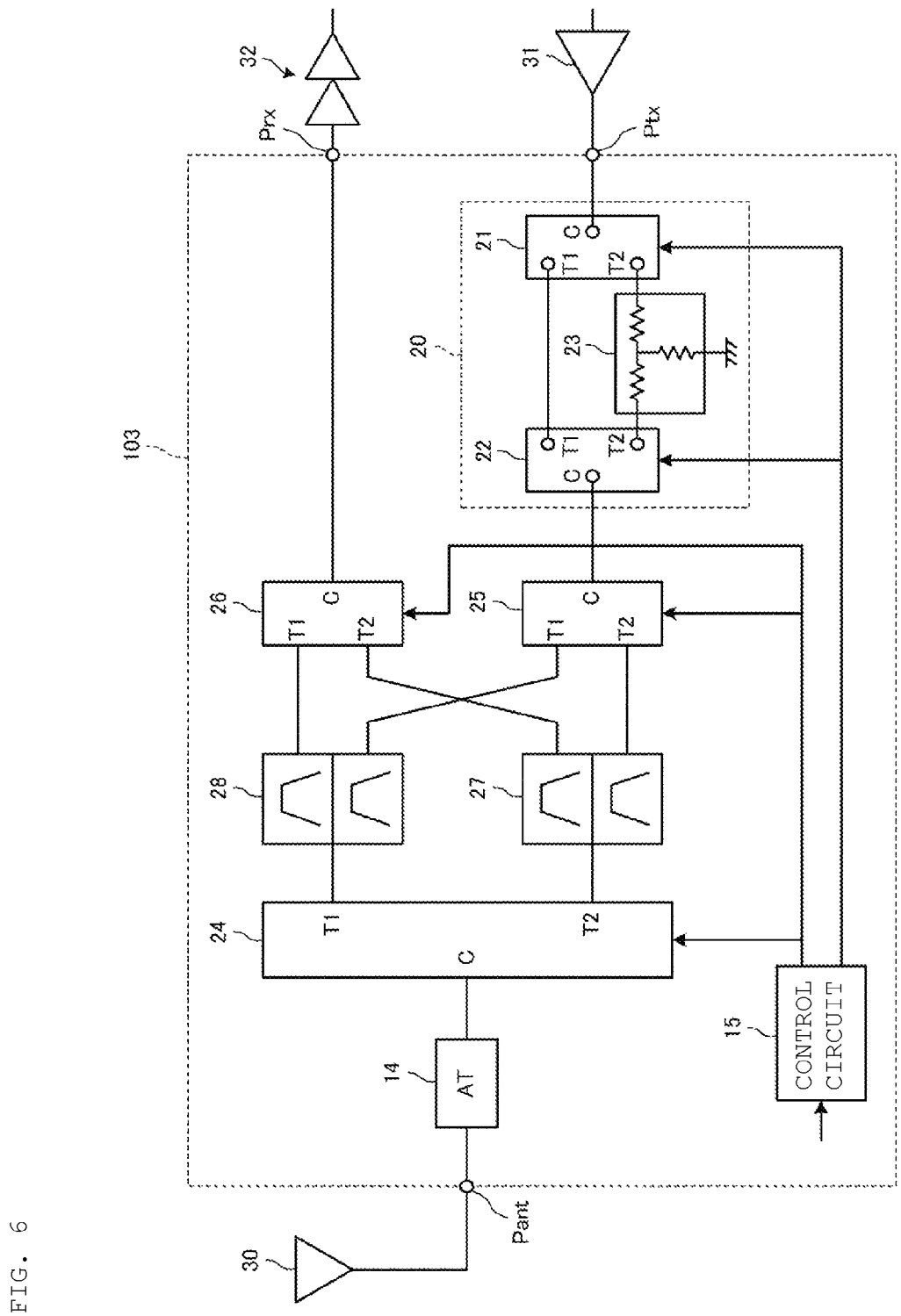
FIG. 6 is a circuit diagram illustrating a high frequency circuit having a front end circuit 103 according to the third embodiment.

FIG. 6 is a circuit diagram illustrating a high frequency circuit having a front end circuit 103 according to the third embodiment. The front end circuit 103 includes an antenna port Pant into/from which transmission/reception signals of an antenna are input/output, a reception port Prx from which the reception signal is output, and a transmission port Ptx into which the transmission signal is input. An antenna 30 is connected to the antenna port Pant, a power amplifier 31 is connected to the transmission port Ptx, and an LNA 32 is connected to the reception port Prx.

An antenna tuning circuit 14 is connected to the antenna port Pant of the front end circuit 103. Further, a transmission output variable circuit 20 is connected to the transmission port Ptx.

Further, the front end circuit 103 includes an antenna side switch 24, duplexers 27 and 28, a transmission side switch 25, and a reception side switch 26. A common terminal of the antenna side switch 24 is connected to the antenna tuning circuit 14 (namely, connected to the antenna side). Common terminals of the duplexers 27 and 28 are connected to individual terminals of the antenna side switch 24, respectively. A common terminal of the transmission side switch 25 is connected to the transmission output variable circuit 20 (namely, connected to the transmission port side). A common terminal of the reception side switch 26 is connected to the side of the reception port Prx. Individual terminals of the transmission side switch 25 are connected to the transmission terminals of the duplexers 27 and 28, and individual terminals of the reception side switch 26 are connected to the reception terminals of the duplexers 27 and 28.

A control circuit 15 controls the transmission output variable circuit 20, the antenna side switch 24, the transmission side switch 25, and the reception side switch 26.

In FIG. 6, the duplexers 27 and 28 are provided according to the communication bands in advance. The antenna side switch 24, the transmission side switch 25, and the reception side switch 26 switch the duplexers 27 and 28 to be used. When the antenna side switch 24, the transmission side switch 25, and the reception side switch 26 select the side of a terminal T1, a transmission signal to be input into the transmission port Ptx is fed to the antenna 30 via the transmission output variable circuit 20, a transmission signal filter of the duplexer 28, and the antenna tuning circuit 14.

A reception signal from the antenna 30 is input into the LNA 32 via the antenna tuning circuit 14 and a reception signal filter of the duplexer 28.

The control circuit 15 increases the attenuation of the transmission output variable circuit 20 based on, for example, the detected result of the proximity sensor described in the first embodiment or the detected result of the reflection signal strength detecting circuit described in the second embodiment when the antenna tuning is missed.

The present invention can also be applied to an antenna duplexing circuit composed of a switch and a duplexer.

Another Embodiment

Figure 7:
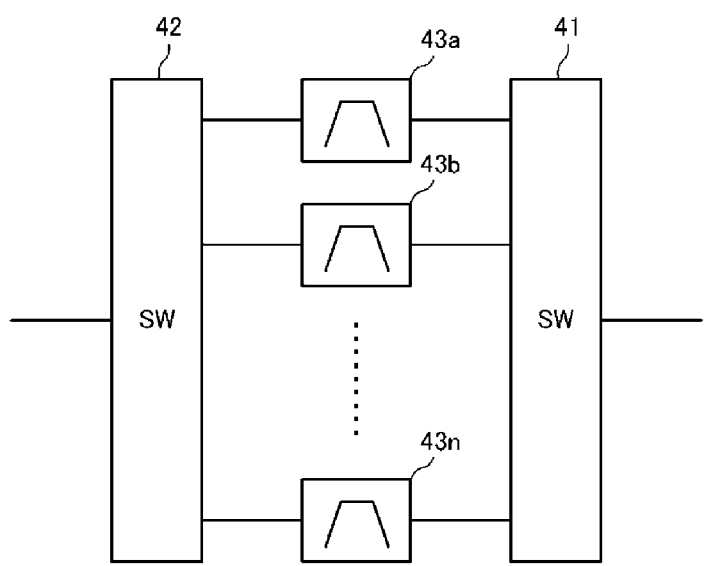
FIG. 7 is a circuit diagram illustrating a transmission signal filter or a reception signal filter composed of a switch and a plurality of band pass filters.

The above embodiments have described the example where both the transmission signal filter 11 and the reception signal filter 12 are constituted by the variable band-pass filters, but in the transmission signal filter and the reception signal filter, for example as shown in FIG. 7, a selectable filter may be composed of a switch and a plurality of band pass filters. In the example shown in FIG. 7, band pass filters 43a, 43b . . . 43n have different pass bands, and the pass bands are switched by selection using switches 41 and 42.

Figure 8:
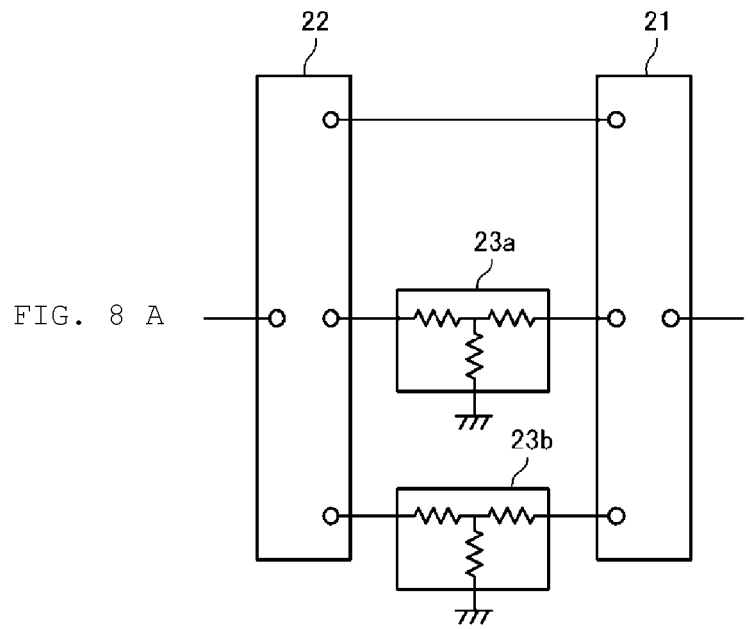
FIGS. 8(A), 8(B) and 8(C) are circuit diagrams illustrating a transmission output variable circuit where the attenuation can be adjusted.
Figure 8:
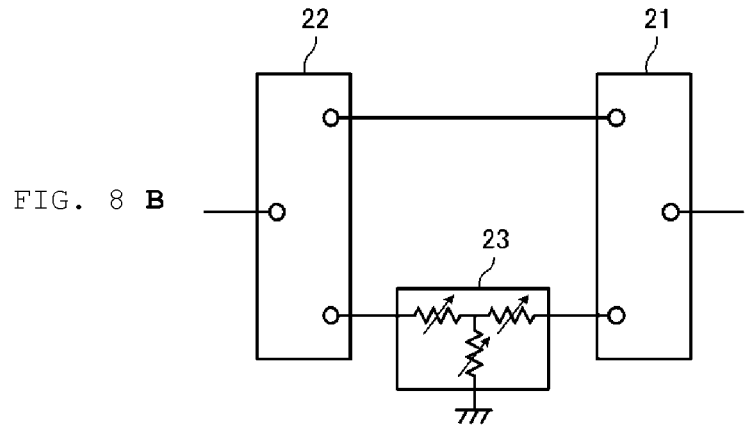
Figure 8:

The above embodiments provide the examples where the transmission output variable circuit 20 has an SPDT switch, and the buffer circuit 23 is switched between the passage state and the through state, but the attenuation of the buffer circuit may be variable. For example, as shown in FIG. 8(A), a circuit may be configured so that that a plurality of buffer circuits 23a and 23b with different attenuation is provided and they can be selected. Further, as shown in FIG. 8(B) and FIG. 8(C), a variable buffer circuit that can adjust the attenuation with a control voltage may be used. When the transmission output variable circuit of which the attenuation is variable is used, a suitable attenuation can be determined according to the reflection strength of a transmission signal in the antenna.

The above embodiments provide the example where the transmission output variable circuit 20 has the T-type buffer circuits 23, but the circuit may have the other configurations such as a π-type buffer circuit or the like.

What is claimed is:

1. A front end circuit comprising: an antenna port into/from which transmission/reception signals of an antenna are input/output; a reception port from which the reception signal is output; a transmission port into which the transmission signal is input; and
    a transmission output variable circuit having an antenna side switch, a plurality of duplexers, a transmission side switch and a reception side switch, a common terminal of the antenna side switch being connected to an antenna side, common terminals of the duplexers being connected to individual terminals of the antenna side switch, a common terminal of the transmission side switch being connected to the transmission port side, a common terminal of the reception side switch being connected to the reception port side, individual terminals of the transmission side switch being connected to transmission terminals of the duplexers, individual terminals of the reception side switch being connected to reception terminals of the duplexers,
    the transmission output variable circuit being connected between the common terminal of the transmission side switch and the transmission port, the transmission output variable circuit limiting strength of the transmission signal according to a control signal.

2. The front end circuit according to claim 1, wherein the transmission output variable circuit is connected between the transmission signal terminal of an antenna duplexer of the plurality of duplexers and a transmission signal filter.

3. The front end circuit according to claim 2, wherein the antenna duplexer is a circulator.

4. The front end circuit according to claim 2, wherein the transmission signal filter and a reception signal filter are a tunable filter having a variable reactive element or a selectable filter composed of a switch and a plurality of filters.

5. The front end circuit according to claim 2, wherein the transmission output variable circuit includes a first high frequency switch, a second high frequency switch and a buffer circuit, and an attenuation between the transmission signal terminal and the transmission signal filter is switched by switching of the first high frequency switch and the second high frequency switch.

6. The front end circuit according to claim 2, further comprising: a proximity sensor for detecting a proximity state that an object comes close to the antenna connected to the antenna port; and a control circuit for increasing an attenuation of the transmission output variable circuit when the proximity sensor detects the proximity state.

7. The front end circuit according to claim 1, wherein an antenna duplexer of the plurality of duplexers is a circulator.

8. The front end circuit according to claim 7, wherein a transmission signal filter and a reception signal filter are a tunable filter having a variable reactive element or a selectable filter composed of a switch and a plurality of filters.

9. The front end circuit according to claim 7, wherein the transmission output variable circuit includes a first high frequency switch, a second high frequency switch and a buffer circuit, and an attenuation between the transmission signal terminal and a transmission signal filter is switched by switching of the first high frequency switch and the second high frequency switch.

10. The front end circuit according to claim 7, further comprising: a proximity sensor for detecting a proximity state that an object comes close to the antenna connected to the antenna port; and a control circuit for increasing an attenuation of the transmission output variable circuit when the proximity sensor detects the proximity state.

11. The front end circuit according to claim 1, wherein a transmission signal filter and a reception signal filter are a tunable filter having a variable reactive element or a selectable filter composed of a switch and a plurality of filters.

12. The front end circuit according to claim 11, wherein the transmission output variable circuit includes a first high frequency switch, a second high frequency switch and a buffer circuit, and an attenuation between the transmission signal terminal and the transmission signal filter is switched by switching of the first high frequency switch and the second high frequency switch.

13. The front end circuit according to claim 1, wherein the transmission output variable circuit includes a first high frequency switch, a second high frequency switch and a buffer circuit, and an attenuation between the transmission signal terminal and a transmission signal filter is switched by switching of the first high frequency switch and the second high frequency switch.

14. The front end circuit according to claim 13, wherein the first high frequency switch is directly connected to the second high frequency switch in the transmission output variable circuit.

15. The front end circuit according to claim 1, further comprising: a proximity sensor for detecting a proximity state that an object comes close to the antenna connected to the antenna port; and a control circuit for increasing an attenuation of the transmission output variable circuit when the proximity sensor detects the proximity state.

16. The front end circuit according to claim 15, further comprising: a reflection signal strength detecting circuit for detecting strength of a reflection signal from the antenna, wherein the control circuit controls the attenuation of the transmission output variable circuit according to the reflection signal strength detected by the reflection signal strength detecting circuit.

17. The front end circuit according to claim 15, further comprising: an antenna tuning circuit connected to the antenna port, wherein
the antenna tuning circuit includes at least one variable reactive element, and the control circuit controls the variable reactive element.

18. The front end circuit according to claim 17, wherein the control circuit controls the antenna tuning circuit to minimize or increase the attenuation of the transmission output variable circuit depending upon a degree of antenna non-tuning.

19. The front end circuit according to claim 1, wherein the transmission output variable circuit includes a first high frequency switch, a second high frequency switch and a buffer circuit, and an attenuation between the transmission signal terminal and a transmission signal filter is switched by switching of the first high frequency switch and the second high frequency switch.

\* \* \* \* \*